United States Patent
Dowling

(10) Patent No.: US 9,262,847 B2
(45) Date of Patent: Feb. 16, 2016

(54) METHOD AND SYSTEM FOR IMPROVED GLYPH CACHE EFFICIENCY

(75) Inventor: Terence S. Dowling, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2230 days.

(21) Appl. No.: 12/257,318

(22) Filed: Oct. 23, 2008

(65) Prior Publication Data
US 2013/0162652 A1    Jun. 27, 2013

(51) Int. Cl.
*G06T 11/00* (2006.01)
*G06T 11/20* (2006.01)
*G06F 17/27* (2006.01)

(52) U.S. Cl.
CPC ............. *G06T 11/203* (2013.01); *G06F 17/275* (2013.01)

(58) Field of Classification Search
CPC ...................................................... G06T 11/203
USPC ................................ 345/471–472.3, 947, 948
See application file for complete search history.

(56) References Cited

U.S. PATENT DOCUMENTS 5,910,805 A * 6/1999 Hickey et al. ................. 345/467

\* cited by examiner

*Primary Examiner* — Stephen R Koziol
*Assistant Examiner* — Robert Craddock
(74) *Attorney, Agent, or Firm* — Wolfe-SBMC

(57) ABSTRACT

A method, system and computer program product encoded on a computer-readable medium for obtaining a glyph rendering are described. A request is received for a rendered first glyph for display on a display device. The request includes rendering information including a first origin. Each device pixel of the display device includes n sub-pixels, where n is an integer greater than 1. A rendered second glyph matching the first glyph is found in a cache of rendered glyphs. A matching rendered second glyph includes a rendered glyph having a second origin offset from the first origin by x/n of a device pixel, where x is an integer ranging between 1 and (n−1). If the second origin is offset from the first origin by x/n, then the density values associated with each sub-pixel of the matching rendered second glyph are shifted by x/n of a device pixel.

14 Claims, 3 Drawing Sheets

METHOD AND SYSTEM FOR IMPROVED GLYPH CACHE EFFICIENCY

BACKGROUND

The present disclosure relates to glyph rendering. FIG. 1 shows two glyphs 100, 102 representing the lower case characters "a" and "e" respectively. Each glyph includes an origin, and location of the origin affects the interglyph spacing, which in turn affects readability. For example, the interglyph spacing can be selected to avoid glyph edges colliding or creating an un-intended word space between glyphs. In the examples shown, the origin location for the glyph outline "a" is at 104 and the origin location for the glyph outline "e" is at 106. The physical resolution of a display device or limitations of a printer device can affect the interglyph spacing. Some display applications can determine the interglyph spacing. Such display applications may assume there is infinite resolution and make a determination as to the ideal origin location for a glyph, and then quantize the origin location based on the limitations of the display device.

SUMMARY

This specification describes technologies relating to glyph rendering. In general, in one aspect, the approaches described herein feature a method, system and computer program product encoded on a computer-readable medium for obtaining a glyph rendering. A request is received for a rendered first glyph for display on a display device. The request includes rendering information, including a first origin of the first glyph. Each device pixel of the display device includes n sub-pixels, where n is an integer greater than 1. A rendered second glyph matching the first glyph is found in a cache of rendered glyphs. A matching rendered second glyph includes a rendered glyph having a second origin offset from the first origin by x/n of a device pixel, where x is an integer ranging between 1 and (n−1). If the matching rendered second glyph has a second origin offset from the first origin by x/n, then the density values associated with each sub-pixel of the matching rendered second glyph are shifted by x/n of a device pixel.

In general, in another aspect, the approaches described herein feature a system for obtaining a glyph rendering including a display application, a cache sub-system including a cache of rendered glyphs and a rendering sub-system. The display application is configured to request a glyph for rendering on a display device, the request including rendering information that includes an origin. Each device pixel of the display device includes n sub-pixels. The cache sub-system is configured to receive the request from the display application and search the cache for a rendered glyph having rendering information and an origin matching the rendering information and first origin included in the request. A matching rendered glyph includes a rendered glyph having an origin offset from the first origin included in the request by x/n of a device pixel, where x is an integer ranging between 1 and (n−1). If a match is found in the cache, then the cache returns the matched rendered glyph to the display application. Otherwise, the cache sub-system obtains a glyph rendering from a rendering sub-system and returns the glyph rendering to the display application. The rendering sub-system is configured to receive from the cache sub-system a request for a glyph rendering including rendering information and first origin, and to return the requested glyph rendering to the cache sub-system.

Implementations of the above described approaches can include one or more of the following features. Providing the matching rendered second glyph can include providing the shifted density values if the second origin was offset from the first origin. Shifting density values associated with each sub-pixel of the matching rendered second glyph by an x/n of a device pixel can include, for each sub-pixel, re-assigning a density value associated with the sub-pixel to another sub-pixel shifted from the sub-pixel by an amount equal to the amount the second origin is offset from the first origin. The integer n can be three and each of the three sub-pixels can represent a different color.

In general, in another aspect, an apparatus is described including a processor and a storage device coupled to the processor and configurable for storing instructions, which, when executed by the processor, cause the processor to perform operations. The operations include receiving a request for a rendered first glyph for display on a display device. The request includes rendering information including a first origin. The operations further include finding in a cache of rendered glyphs a rendered second glyph matching the first glyph and having a second origin offset from the first origin. Sub-pixel density values of the matching rendered second glyph are shifted to account for the second origin offset. The second glyph with the shifted density values is provided in response to the request.

Particular embodiments of the subject matter described in this specification can be implemented to realize one or more of the following advantages. A single glyph rendering stored in a glyph cache can be used to represent the glyph having more than one distinct origin. For example, if the glyph is to be displayed on a color display where each pixel includes three sub-pixels, a single glyph rendering can represent the glyph at three different origins. As a result, the glyph cache can be used to represent three times as many glyphs, saving in glyph cache storage requirements and reducing the number of glyph renderings that must be obtained by the glyph cache. The efficiency of the glyph cache in providing a glyph rendering is thereby improved.

The details of one or more embodiments of the approaches described are set forth in the accompanying drawings and the description below. Other features, aspects, and advantages of these approaches will become apparent from the description, the drawings, and the claims.

BRIEF DESCRIPTION OF THE DRAWINGS

Like reference numbers and designations in the various drawings indicate like elements.

DETAILED DESCRIPTION

Figure 2:
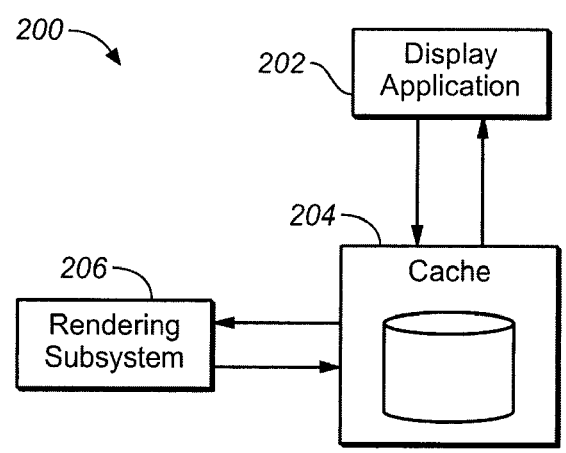
FIG. 2 is a schematic representation of a system for obtaining a glyph rendering.

FIG. 2 shows a schematic representation of an example system 200 that can obtain a glyph rendering for display on a display device, for example, a computer monitor, cellular phone, PDA, or any other device with a visual display. The system 200 includes a display application 202, a glyph cache 204 and a rendering sub-system 206. The display application 202 can be code or logic implemented as software, hardware and/or firmware (e.g., the display application can be loaded into RAM as an application, or can be in flash ROM), that makes determinations as to glyph layout including interglyph spacing. The display application 202 determines for each glyph to be rendered the particular origin location of the glyph, which can then be quantized based on constraints of the display device.

The glyph cache 204 is a cache of glyphs that have already been rendered. An origin location can be represented as an integer portion and a fractional portion. For example, the origin location can be 10.5, where "10" is the integer portion and "0.5" is the fractional portion. For example, the integer portion can indicate the pixel in which the origin will be located and the fractional portion can indicate where within that particular pixel the origin will be located. In this example, the fractional portion is 0.5, and therefore the origin location is in the middle of the pixel. In another example, if the origin location is 30.33, then "30" indicates the pixel in which the origin is located and the origin location is 0.33 from a left edge of the pixel.

The display application 202 sends a request for a glyph to rendered to the glyph cache 204. If the glyph to be rendered is not already stored in the glyph cache 204, then the rendering sub-system 206 is sent a request for the particular glyph rendering, which can then be provided to and inserted into the glyph cache 204. The glyph cache 204 provides the glyph rendering to the display application 202. Alternatively, the glyph rendering can be provided directly from the glyph rendering sub-system 206 to the display application 202.

The request sent from the display application 202 to the glyph cache includes various glyph information about the glyph that is required including the origin location. For example, the request can include, in addition to the origin location: the name of the font in which the glyph is to be rendered; a glyph identifier corresponding to the particular glyph within the font; the size at which the glyph is to be rendered (e.g., expressed as point size, pixels per em or some other scale factor); whether the glyph is to be rendered in monochrome or color; the device transformation (e.g., scale in pixels per unit); orientation (e.g., expressed as a rotation matrix); and/or the slant/skew of the glyph. The glyph information included in the request provides criteria that can be used to search for a matching glyph that has already been rendered and is stored within the cache.

In some implementations, the glyph cache 204 can include logic configured to perform the search. In other implementations, the search logic can be included in another sub-system coupled to the glyph cache 204. Retrieving the glyph from the cache 204 is more efficient than having to request the rendering sub-system 206 to render the glyph. Accordingly, it is desirable to find a matching glyph within the cache 204 as often as possible.

The term "cache sub-system" refers to the glyph cache (i.e., the stored glyph renderings) and the logic configured to manipulate, e.g., search, the glyph cache and make a request to the rendering sub-system 206 if a matching glyph is not found. In implementations where the glyph cache 204 includes such logic, then the glyph cache is the cache sub-system. In other implementations where the logic is external to the glyph cache 204, the logic together with the glyph cache is the cache sub-system. In an example implementation, the cache sub-system is located where the final display image is composited, for example, in a GPU (Graphics Processor Unit) for those configurations having both a GPU and a CPU (Central Processing Unit). In another example implementation, the cache sub-system is located in the CPU. In yet another example implementation, the logic can be located in the CPU and the cache located on the GPU, in configurations having both a GPU and a CPU. Other configurations are possible, and the ones described are illustrative and not limiting. In some embodiments, the glyph cache is a density value implementation, in other embodiments the glyph cache is a high resolution bit-map implementation, and in yet other embodiments the glyph cache can include glyph renderings in any other convenient form.

One criterion required for a match is a matching origin location. For the purpose of matching a glyph in the cache 204 to the glyph information, only the fractional portion of the origin location is considered. That is, from the perspective of the glyph cache 204, all origin locations are in the 0 to 1 range. In other implementations, the origin locations are described in the −0.5 to +0.5 range. Using the 0 to 1 range and referring to the example above where the origin location is 10.5, for the purpose of finding a matching origin location within the glyph cache 204, the search looks for a glyph having an origin location of 0.5.

A pixel in a display device can be formed from multiple sub-pixels. For example, a pixel for a color display monitor can be made up of three sub-pixels each in a different color, i.e., red, green and blue sub-pixels, positioned adjacent one another (other colored pixels are possible and red, green and blue are but one example). The approaches described herein provide that a glyph included within the glyph cache 204 matches the origin location included in the glyph information of a request if the origin location of the glyph in the cache 204 is either identical to the requested origin location or is shifted by ⅓ or ⅔ of a sub-pixel.

Figure 3A:
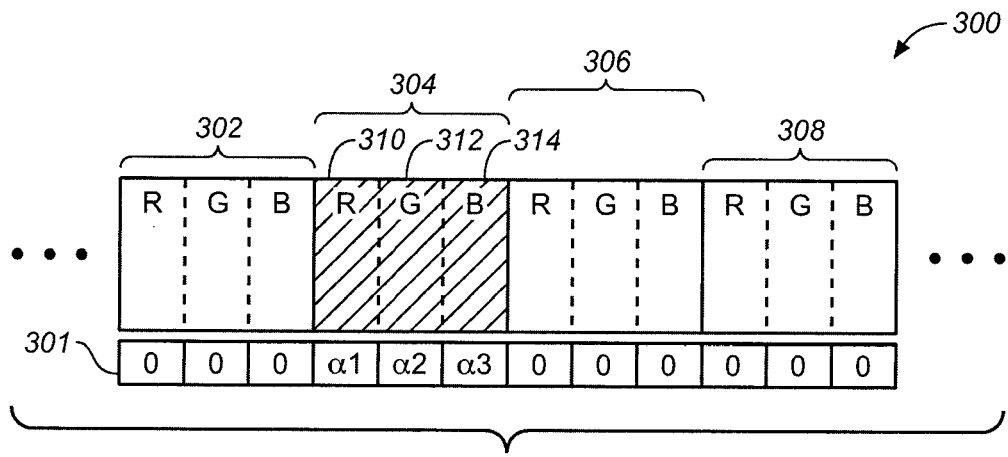
FIGS. 3A, 3B and 3C are schematic representations of a portion of a scan line and corresponding density values for pixels in the scan line.

Referring to FIG. 3A, a schematic representation of a portion of a scan line 300 used in the representation of a glyph on a display device is shown. Beneath the scan line, a table 301 displays the density value for each sub-pixel in the scan line 300. The display device includes one red, green and blue colored sub-pixel per pixel. Each sub-pixel is assigned a density value (sometimes referred to as an alpha value) that indicates the intensity of the foreground color as compared to the background color. For example, a value of 0 can indicate no foreground color, meaning the pixel is unmarked, e.g., pixels 302, 306 and 308. A value of 1 can indicate 100% foreground color, meaning the pixel is marked at full intensity. A monochromatic representation of a glyph includes density values of only 0 or 1, that is, the pixel is either 100% background color or 100% foreground color. In a high definition color representation of the glyph, there can be a range of values between 0 and 1 indicating a range of intensities of the foreground color versus the background color. In some implementations, each pixel is represented by a 24 bit density value, where the density value of each of the three sub-pixels is represented by 8 bits. Each sub-pixel can have $2^8$ possible values, i.e., 256 values, each value representing a different density value of the sub-pixel.

If the glyph cache includes a rendered glyph that matches all of the required glyph information included in a request and has an origin location that is either the same as or ⅓ or ⅔ of a pixel shifted from the origin location in the request, then the rendered glyph in the cache is a match. For example, if the request included an origin location of 0.5, then a rendered glyph in the glyph cache having an origin location of either 0.1667, 0.5 or 0.8333 is a match. As another example, if the request included an origin location of 0, then a rendered glyph in the glyph cache having an origin location of either 0, 0.3333 or 0.6667 is a match.

Although in this illustrative example the origin location values have been rounded to 4 decimal places, it should be understood that other implementations for expressing a fraction can be employed. For example, in some implementations, the glyph origin is represented by 16 bits of integer precision and 16 bits of fractional precision, but other implementations are possible, for example, using an IEEE floating point or another representation.

If the matched rendered glyph from the cache has an origin location that is offset by ⅓ or ⅔ of a pixel, then to account for the offset, the density values of the sub-pixels are shifted by the amount the origin location is offset. For example, referring to FIGS. 3A-C, we shall consider an example where the origin location of the rendered glyph in the glyph cache is 0. FIG. 3A shows a schematic representation of a particular pixel in a scan line of a representation of the glyph. The pixel 304 includes a red sub-pixel 310, a green sub-pixel 312 and a blue sub-pixel 314, each of which have density values of α1, α2 and α3 respectively.

Figure 3B:
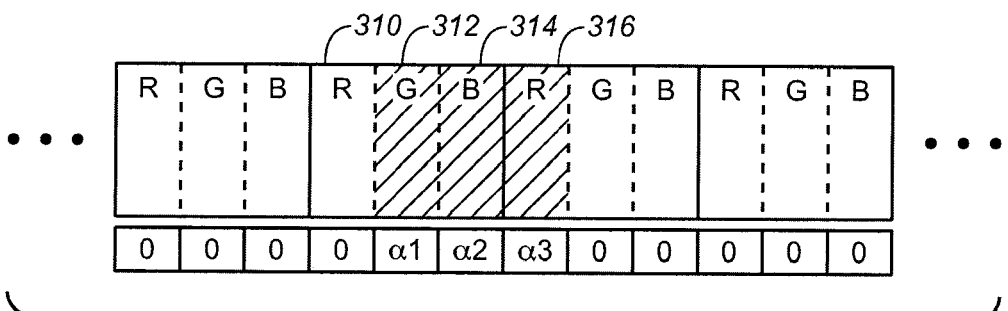

If the request for a rendered glyph has an origin location of 0.3333, then the glyph cache returns the rendered glyph having the origin location of 0, however, the density values of the sub-pixels need to be shifted by ⅓ of a pixel, as shown in FIG. 3B. That is the density value of the red sub-pixel 310 becomes 0; the density value of the green sub-pixel 312 becomes α1; the density value of the blue sub-pixel 314 becomes α2; and the density value of the neighboring red sub-pixel 316 becomes α3.

Figure 3C:
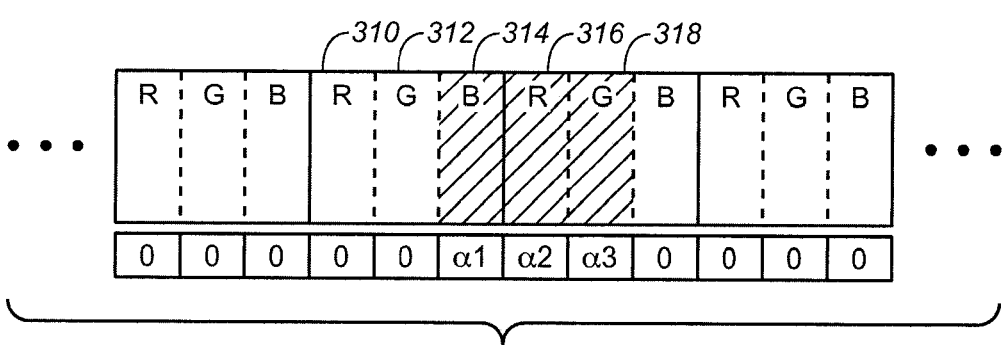

Referring to FIG. 3C, if the request for a rendered glyph has an origin location of 0.6667, then the glyph cache returns the rendered glyph having the origin location of 0, however, the density values of the sub-pixels need to be shifted by ⅔ of a pixel. That is, the density value of the red sub-pixel 310 becomes 0; the density value of the green sub-pixel 312 becomes 0; the density value of the blue sub-pixel 314 becomes α1; the density value of the neighboring red sub-pixel 316 becomes α2; and the density value of the neighboring green sub-pixel 318 becomes α3.

Because the rendered glyph in the glyph cache 204 can be returned for up to three different origin locations, the number of calls to the rendering sub-system 206 to return a rendered glyph can be reduced by 66%, meaning substantially improved efficiency. It is computationally more expensive to call the rendering sub-system 206 for a glyph rendering, than to search and retrieve an already rendered glyph from the glyph cache 204. Accordingly, reducing the numbers of times the rendering sub-system 206 must be called has a significant impact on the efficiency of the glyph cache. Additionally, the glyph cache 204 can be populated with far fewer rendered glyphs.

Figure 4:
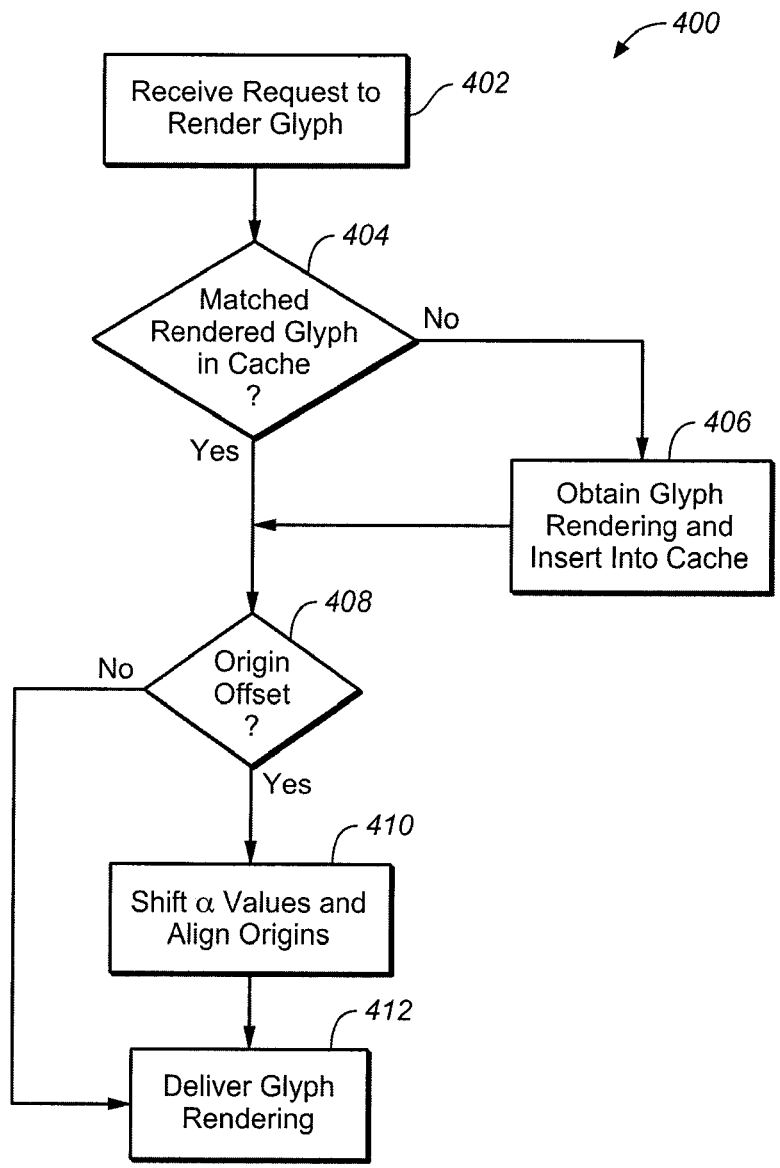
FIG. 4 is a flowchart showing an example method for obtaining a glyph rendering.

FIG. 4 is a flowchart showing an example method 400 for rendering a glyph. A request is received to render a glyph (Step 402). By way of illustrative example, the method 400 can be implemented using the system 200 of FIG. 2, although a differently configured system can also be used. In this example, the request can be received at the glyph cache 204 from the display application 202. A search of a glyph cache is performed to determine whether there is a rendered glyph in the cache that matches the glyph information included in the request (Step 404). For example, the glyph cache 204 can be searched for a matching glyph. As previously discussed, the glyph information included in the request includes an origin location, and can include other information such as the font name, glyph identifier, size, monochrome or color, the device transformation (e.g., scale in pixels per unit), glyph orientation, and/or the slant/skew of the glyph, to name some examples.

If no match is found in the glyph cache ("No" branch of Step 404), then a glyph rendering is obtained and inserted into the glyph cache (Step 406). For example, if the glyph cache 204 does not include a match, then the glyph cache 204 can request a glyph rendering from the rendering sub-system 206. The glyph rendering is received from the rendering sub-system 206 and inserted into the glyph cache 204.

If a match is found in the glyph cache ("Yes" branch of Step 404), then a determination is made as to whether the origin location of the glyph rendering is the same as the origin location in the request or offset by ⅓ or ⅔ of a pixel (Step 406). If the origin location is not offset ("No" branch of Step 406), then the glyph rendering can be delivered in response to the request (Step 412). If the origin location is offset ("Yes" branch of Step 406), then the density values included in the glyph rendering will be shifted by the offset amount, i.e., ⅓ or ⅔ of a pixel, so as to align the origin location (Step 410). The glyph rendering with the shifted density values is delivered in response to the request (Step 412). In some implementations, logic implementing the density value shifting is included in the glyph cache 204. In other implementations, the density value shifting is performed by the display application 202, or an intermediary sub-system.

In implementations where color masking is balanced such that the density values of the sum of the red, green and blue sub-pixels respectively are uniform across a scan line, shifting the density values by one or two sub-pixels does not change the value of the sub-pixel sum across the scan line. Accordingly, shifting the density values does not affect the color balance. However, the approaches described herein for shifting density values do not require a balanced color filter. If a balanced color filter is not employed, there can be color artifacts in glyph renderings output to a display device, and the approaches described do not make this better or worse.

The implementations described herein are in the context of a color display where each pixel is formed of red, green and blue sub-pixels. However, it should be understood that the approaches described can be implemented in other applications. In general, if a device pixel of the display device includes n sub-pixels, n being an integer greater than 1, then the origin of a rendered glyph in a cache can match the origin included in a request, if the origin is offset from the requested origin by x/n of a device pixel, where x is an integer ranging between 1 and (n−1). The density values associated with each sub-pixel of the matching rendered glyph can then be shifted by x/n of a device pixel to account for the offset. As another example, a colored pixel may be divided into 6 sub-pixels. In this implementation, the origin location can be shifted by either ⅙, ⅓, ½, ⅔ or ⅚ of a pixel (i.e., ⅙, 2/6, 3/6, 4/6 or 5/6). In another example, a gray-scale output can be displayed with 2 or 4 sub-pixels per pixel. In this implementation, the origin location can be shifted by either 1 or 3 sub-pixels respectively.

There is a trade-off that can occur for how many sub-pixel values are used. More sub-pixel values can yield a higher quality rendering result, but at a cost in performance and memory. In some implementations, a system can use as many as 8 sub-pixel positions (more can be used, but generally there will not be perceptible rendering differences once 8 sub-pixels is exceeded). Using the approaches described herein, a 3 sub-pixel position implementation can be achieved at nearly zero cost and with a noticeable benefit. A 6 sub-pixel position implementation can be achieved at the cost of a 2 sub-pixel position implementation, also providing a noticeable benefit.

Figure 1:
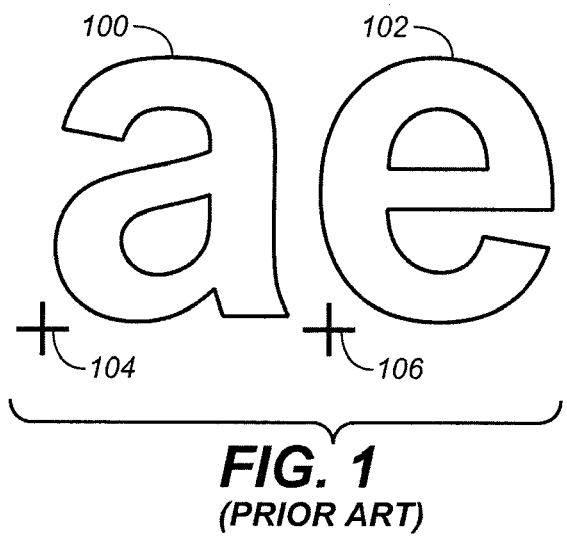
FIG. 1 shows two glyph outlines and their corresponding origin locations.

Referring again to FIG. 1, in the examples described above, the glyph origin is shifted in the direction of the width of the glyph, which for illustrative purposes shall be referred to as the "x" direction, as compared to in the direction of the height of the glyph, which shall be referred to as the "y" direction. If the display device origin and the normal text origin are aligned, e.g., the red/green/blue stripes of sub-pixels are orientated vertically and advance in the x direction and text displayed on the display device also advances in the x direction, then the glyph origin can be shifted in the x direction. However, if the display device origin and the normal text origin are orientated 90° relative to one another, e.g., if the device is switched between landscape and portrait modes or if text is orientated in the y direction such as a label on the y axis of a graph, then the x and y components of the glyph origin are flipped. That is, the approaches described herein can be used to shift the y component of the glyph origin in the horizontal direction, thereby changing the baseline of the glyph origin rather than the interglyph spacing. That is, the approaches can be used to adjust line-to-line spacing between lines of glyphs, as compared to interglyph spacing.

In other implementations, more than one density value can be assigned to each sub-pixel. For comparative purposes, consider the following example, where origin granularity is required at 1/6 of a device pixel in the context of a red-green-blue sub-pixel environment. One option is to render the glyph twice, for example with the original at 0 and the origin at 1/6. The two glyph renderings can then be used for glyph renderings having an origin at either 0, 1/3 or 2/3 using the first rendering and 1/3 pixel shifting, or having an origin at either 1/6, 3/6 or 5/6 using the second rendering and 1/3 pixel shifting. Using this option, two glyph renderings are stored in a glyph cache and can provide glyph renderings at 6 origin positions.

However, a second option is to have only one glyph rendering, but two density values for each sub-pixel (e.g., left and right values for illustrative purposes), which density values can be combined (or shifted and combined) to provide the glyph rendering at 6 different origin positions (i.e., 0, 1/6, 2/6, 3/6, 4/6 and 5/6). That is, the density values can be shifted by 1/6 of a pixel since there are 6 density values. However, to render the glyph, the two density values assigned to each sub-pixel are combined to provide one density value per sub-pixel.

The first option provides two glyph renderings, the second option provides one glyph rendering, but more processing for each glyph cache use, on account of the step of combining the density values. The second option may be preferred if glyph rendering is comparatively computationally expensive and the density value combining step is relatively inexpensive. As one illustrative example, a CPU glyph rendering with a GPU based cache, where the shifting and combining steps are performed by the GPU, may favor the second option.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the approaches described or of what may be claimed, but rather as descriptions of features specific to particular embodiments of the approaches described. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While, particular embodiments of the approaches described herein are set forth above, other embodiments are within the scope of the following claims. For example, the actions recited in the claims can be performed in a different order and still achieve desirable results. As another example, the approaches described can be used in a GPU (graphics processing unit) based implementation.

What is claimed is:

1. A computer implemented method comprising:
   receiving a request for a rendered first glyph for display on a display device, where the request includes rendering information that includes a first origin and each device pixel of the display device comprises n sub-pixels, where n is an integer greater than 1;
   finding in a cache of rendered glyphs a rendered second glyph matching the first glyph, where a matching rendered second glyph includes a rendered glyph having a second origin offset from the first origin by x/n of a device pixel, where x is an integer ranging between 1 and (n−1); and
   shifting density values associated with each sub-pixel of the matching rendered second glyph by x/n of a device pixel if the matching rendered second glyph has a second origin offset from the first origin by x/n.

2. The method of claim 1, further comprising:
   providing the matching rendered second glyph, including the shifted density values if the second origin was offset from the first origin.

3. The method of claim 1, wherein shifting density values associated with each sub-pixel of the matching rendered second glyph by an x/n of a device pixel comprises:
   for each sub-pixel, re-assigning the density value associated with the sub-pixel to another sub-pixel shifted from the sub-pixel by an amount equal to the amount the second origin is offset from the first origin.

4. The method of claim 1, where n is three and each of the three sub-pixels represents a different color.

5. A system comprising:
   a computing device comprising:
      a display application configured to request a first glyph for rendering on a display device, the request including rendering information that includes a first origin, where each device pixel of the display device comprises n sub-pixels;
      a cache sub-system including a cache of rendered glyphs, where the cache sub-system is configured to:
         receive the request from the display application;
         search the cache for a rendered second glyph having rendering information and a second origin matching the rendering information and first origin of the first glyph, where a matching rendered glyph includes a rendered second glyph having the second origin offset from the first origin included in the request by x/n of a device pixel, where x is an integer ranging between 1 and (n−1);
         if a match is found in the cache, then return the matched rendered second glyph to the display application, else obtain a glyph rendering from a rendering sub-system and return the glyph rendering to the display application;
      the rendering sub-system configured to:
         receive from the cache sub-system a request for a glyph rendering including rendering information and a first origin; and
         return the requested glyph rendering to the cache sub-system.

6. The system of claim 5, wherein the cache sub-system is further configured to shift density values of the matched rendered glyph if the second origin is offset from the first origin.

7. The system of claim 6, wherein shifting density values comprises:
   for each sub-pixel, re-assigning a density value associated with the sub-pixel to another sub-pixel shifted from the sub-pixel by an amount equal to the amount the second origin is offset from the first origin.

8. The system of claim 5, where n is three and each of the three sub-pixels represents a different color.

9. A computer program product, encoded on a computer-readable storage device, operable to cause data processing apparatus to perform operations comprising:
   receiving a request for a rendered first glyph for display on a display device, where the request includes rendering information including a first origin and each device pixel of the display device comprises n sub-pixels, where n is an integer greater than 1;
   finding in a cache of rendered glyphs a rendered second glyph matching the first glyph, where a matching rendered second glyph includes a rendered glyph having a second origin offset from the first origin by x/n of a device pixel, where x is an integer ranging between 1 and (n−1); and
   shifting density values associated with each sub-pixel of the matching rendered second glyph by x/n of a device pixel, if the matching rendered second glyph has a second origin offset from the first origin by x/n.

10. The computer program product of claim 9, further operable to cause data processing apparatus to perform operations comprising:
    providing the matching rendered second glyph, including the shifted density values if the second origin was offset from the first origin.

11. The computer program product of claim 9, wherein shifting density values associated with each sub-pixel of the matching rendered second glyph by a x/n of a device pixel comprises:
    for each sub-pixel, re-assigning the density value associated with the sub-pixel to another sub-pixel shifted from the sub-pixel by an amount equal to the amount the second origin is offset from the first origin.

12. The computer program product of claim 9, where n is three and each of the three sub-pixels represents a different color.

13. An apparatus comprising:
a processor;
a storage device coupled to the processor and configurable for storing instructions, which, when executed by the processor, cause the processor to perform operations comprising:
  receiving a request for a rendered first glyph for display on a display device, where the request includes rendering information including a first origin;
  finding in a cache of rendered glyphs a rendered second glyph matching the first glyph and having a second origin offset from the first origin;
  shifting sub-pixel density values of the matching rendered second glyph to account for the second origin offset; and
  in response to the request, providing the second glyph with the shifted density values.

14. The apparatus of claim 13, wherein shifting sub-pixel density values of the matching rendered second glyph comprises:
for each sub-pixel, re-assigning a density value associated with the sub-pixel to another sub-pixel shifted from the sub-pixel by an amount equal to the amount the second origin is offset from the first origin.

* * * * *